United States Patent [19]
Simmons et al.

[11] Patent Number: 5,975,736
[45] Date of Patent: Nov. 2, 1999

[54] SCRUBBER CONTROL SYSTEM

[75] Inventors: Mark A. Simmons, San Jose; Martin J. McGrath, Sunnyvale; David L. Thrasher, Santa Clara, all of Calif.

[73] Assignee: OnTrak Systems, Inc., Milpitas, Calif.

[21] Appl. No.: 08/687,977

[22] Filed: Jul. 29, 1996

Related U.S. Application Data

[62] Division of application No. 08/275,797, Jul. 15, 1994, Pat. No. 5,548,505.

[51] Int. Cl.⁶ .............................. G05B 15/00; G06F 17/00
[52] U.S. Cl. ........................... 364/132; 709/107; 710/128
[58] Field of Search ................................ 364/132, 281.7, 364/230.4, 231.4, 231.6, 228.1, 240.2, 240.9, 281.3, 474.11, 478.18, 468.15; 395/677; 473/86; 318/34; 198/349; 709/107, 208; 710/107, 110, 128, 108

[56] References Cited

U.S. PATENT DOCUMENTS

| | | | |
|---|---|---|---|
| 3,645,581 | 2/1972 | Lasch, Jr. et al. | 302/2 |
| 4,062,463 | 12/1977 | Hillman et al. | 214/301 |
| 4,100,597 | 7/1978 | Fleming et al. | 364/474.11 |
| 4,247,899 | 1/1981 | Schiller et al. | 364/479.11 |
| 4,313,266 | 2/1982 | Tam | 34/8 |
| 4,510,565 | 4/1985 | Dummermuth | 364/136 |
| 4,568,866 | 2/1986 | Floro et al. | 318/696 |
| 4,677,758 | 7/1987 | Aigo | 34/58 |
| 4,829,445 | 5/1989 | Burney | 364/478.18 |
| 4,902,350 | 2/1990 | Steck | 134/1 |
| 4,923,054 | 5/1990 | Ohtani et al. | 187/25 |
| 4,989,345 | 2/1991 | Gill, Jr. | 34/58 |
| 5,081,733 | 1/1992 | Kudo | 15/77 |
| 5,108,513 | 4/1992 | Muller et al. | 134/15 |
| 5,136,222 | 8/1992 | Yamamoto et al. | 364/474.11 |
| 5,213,451 | 5/1993 | Frank et al. | 406/72 |
| 5,274,767 | 12/1993 | Maskovyak | 395/275 |
| 5,396,417 | 3/1995 | Burks et al. | 340/825 |
| 5,420,485 | 5/1995 | Campbell, Jr. | 318/34 |
| 5,442,828 | 8/1995 | Lutz | 15/88.3 |
| 5,628,693 | 5/1997 | Mowers et al. | 473/86 |

FOREIGN PATENT DOCUMENTS

| | | | |
|---|---|---|---|
| 8505758 | 12/1985 | European Pat. Off. | |
| 61-168002 | 7/1986 | Japan | 364/132 |

*Primary Examiner*—William Grant
*Assistant Examiner*—Steven R. Garland
*Attorney, Agent, or Firm*—Blakely, Sokoloff, Taylor & Zafman LLP

[57] ABSTRACT

A control system. An apparatus having a motor; a host processor for generating a message containing motor control information; a control board for receiving the message and for transmitting a command, corresponding to the message, to the motor; and a communications medium coupling the host processor and the control board. The communications medium supports a first communications path and a second communications path. The first communications path is for transmitting messages from the host processor to the control board. The second communications path is for transmitting messages from the control board to the host processor.

19 Claims, 12 Drawing Sheets

SCRUBBER CONTROL SYSTEM

This is a divisional of application No. 08/275,797, filed Jul. 15, 1994, now U.S. Pat. No. 5,548,505.

BACKGROUND OF THE INVENTION

1. Field of Invention

The present invention relates to the field of control systems. In particular, the present invention describes a control system having improved reliability and extendibility for semiconductor processing equipment.

2. Description of Related Art

Semiconductor manufacturers use semiconductor wafers as the base for manufacturing integrated circuits. In one step of the manufacturing process, the wafers are put through a chemical-mechanical polishing step that leaves the wafers' surfaces covered in particles. Semiconductor manufacturers use double sided wafer scrubbers (scrubbers) to clean the semiconductor wafers after being polished. Double sided wafer scrubbers clean both sides of each wafer to remove these particles.

To reduce the risk of damaging the wafers, automated scrubbers have been developed. Scrubbers typically include a number of automated stations that operate together to clean wafers. Typically, to clean a wafer, the wafer must first be loaded from the cassette (a device for holding wafers), washed, brushed, dried, and then placed into another cassette. Typically, a scrubber cleans multiple wafers at the same time; one wafer being in each station.

Scrubber customers demand scrubbers that can continuously repeat the processing steps for many wafers with very few differences between the processing of individual wafers. This repeatability of the wafer processing is important to scrubber customers.

To reduce the costs of supporting scrubber customers, the reliability of the scrubbers must be very high. Typically, semiconductor equipment manufacturers sell their products globally. Therefore, correcting problems on a scrubber can be expensive as technicians may need to travel great distances at significant cost.

Scrubber customers often require special modifications to a basic scrubber design. For example, a customer may require that the scrubber's output station provide wafers to another semiconductor processing station. These special modifications can be expensive to implement.

One prior art scrubber, the DDS-200 Doubled Sided Scrubber, available from OnTrak Systems, Inc., of Milpitas, Calif., achieved many of these goals. However, customers continue to demand scrubbers with greater repeatability, higher reliability, and more features. To meet these customer demands, an improved control system is needed.

SUMMARY OF THE INVENTION

An improved control system as can be used in a double sided wafer scrubber is described. One embodiment of the present invention includes an apparatus having a motor; a host processor for generating a message containing motor control information; a control board for receiving the message and for transmitting a command, corresponding to the message, to the motor; and a communications medium coupling the host processor and the control board. The communications medium supports a first communications path and a second communications path. The first communications path is for transmitting messages from the host processor to the control board. The second communications path is for transmitting messages from the control board to the host processor.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

OVERVIEW

An improved control system as can be used in a double sided wafer scrubber is described. The described control system can also be used in other systems such as chemical mechanical polishing systems or flat panel display manufacturing systems. In the following description, numerous specific details are set forth such as the control system's hardware components, communications protocol, etc., in order to provide a thorough understanding of the present invention. It will be obvious, however, to one skilled in the art that the present invention may be practiced without these specific details. In other instances, well-known board processors, circuits, structures and techniques have not been shown in detail in order not to unnecessarily obscure the present invention.

In the following description, a scrubber, in which one embodiment of the present invention may operate, is presented. The scrubber includes a number of stations that work together to perform the task of cleaning wafers. The control system used to operate the scrubber is then presented. The control system is first described in terms of the hardware components and then the processes that execute on the hardware.

In this scrubber, a number of improvements over the prior art exist. To increase the repeatability and reliability of the scrubber, a new control system is described. The new control system allows finer control over the various motors in the scrubber. Also, the packaging used for the control system has been improved over the prior art. The new packaging reduces motor control signal noise, improves the manufacturability and testability of the scrubbers, and reduces the cost of maintaining the scrubbers.

Other improvements further reduce the costs of maintaining the scrubbers. The new control system allows self testing of various components. The physical and testable visibility of components are improved.

The new control system is more easily extensible through a modular approach. This allows easier addition of special features for customers. Scrubber feature extensions require less time, are more reliable, and can often be more easily priced.

SCRUBBER

Figure 1:
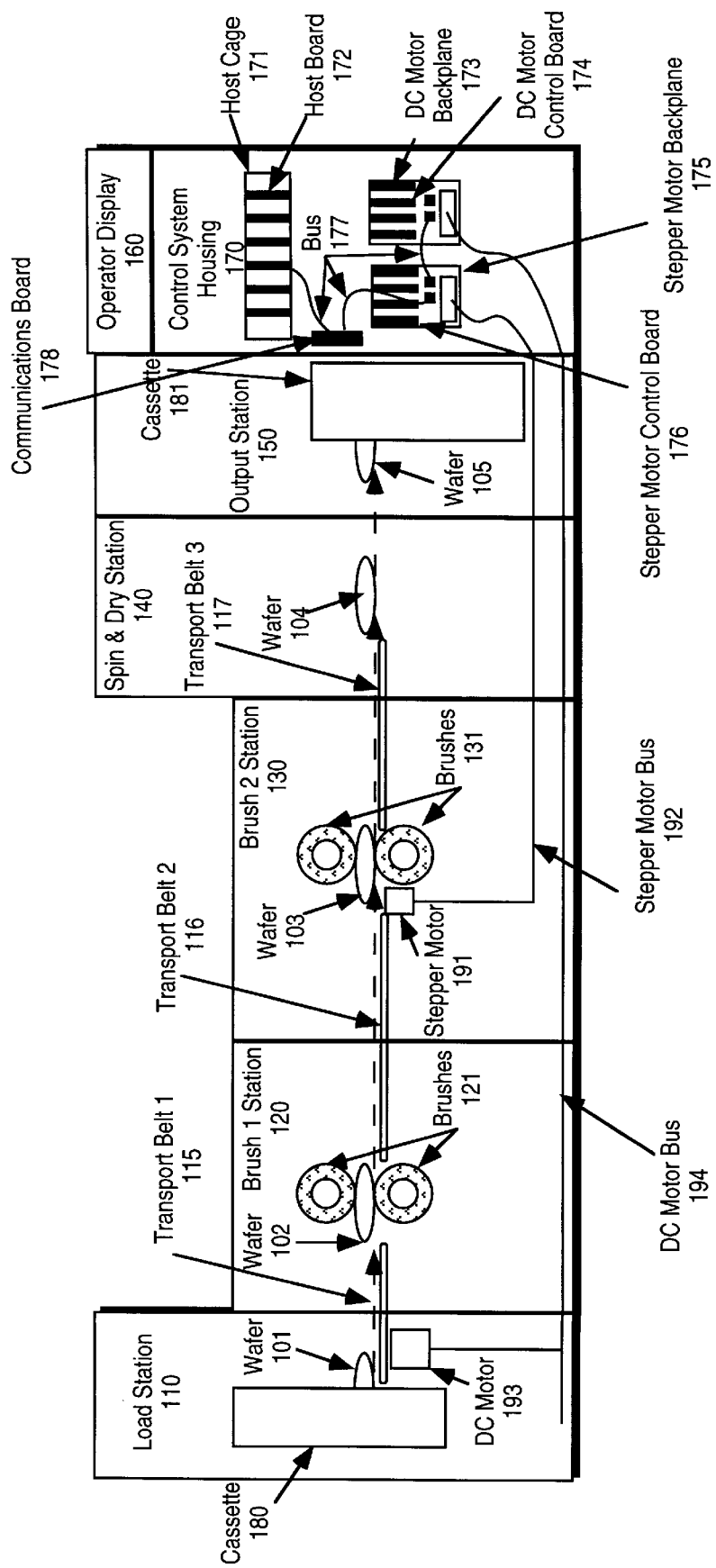
FIG. 1 illustrates a conceptual view of a double sided wafer scrubber.

FIG. 1 illustrates a conceptual view of a double sided wafer scrubber (scrubber) as may be used by one embodiment of the present invention. The scrubber includes a number of stations. Each of theses stations logically represent one or more steps in the wafer cleaning process. These stations can also include the hardware and software that completes one of the steps in the cleaning process. The cleaning process includes the steps executed by the scrubber on the wafers. In one embodiment, the scrubber can process multiple wafers simultaneously; one or more wafers are being processed in each of the stations at a point in time.

Dirty wafers are loaded at one end of the scrubber; clean wafers are unloaded from the other end of the scrubber.

In load station 110 (also known as the input station), the operator loads a cassette 180 into the scrubber. The cassette 180 contains a number of dirty wafers. Wafers are automatically moved from load station 110 to brush 1 station 120 on transport belt 1 115. Transport belt 1 115 is moved by DC motor 193. Wafer 101 represents a dirty wafer being automatically removed from cassette 180 and placed on transport belt 1 115.

In brush 1 station 120, a dirty wafer 102, is brushed and sprayed (water jets not shown), to remove some of the particles from the dirty wafer 102. Brushes 121 scrub both sides of the dirty wafer 102. The height of the top brush is controlled by a stepper motor (not shown). The once brushed wafers are then automatically moved to brush 2 station 130. This is done by transport belt 2 116, controlled by a second DC motor (not shown).

In brush 2 station 130, a once brushed wafer 103 is brushed and sprayed (water jets not shown), to remove more of the particles from the once brushed wafer 103. Brushes 131 scrub both sides of the once brushed wafer 103. The height of the top brush of brushes 131 are controlled by stepper motor 191. The twice brushed wafers are then automatically moved to spin & dry station 140, via transport belt 3 117.

Spin & dry station 140 rinses the wafers, spins them, and dries them. Wafer 104 represents a wafer being processed in the spin & dry station 140. At this point, the wafer has been cleaned. Note, for one particular type of wafer, the wafer must have been kept wet during the load station 110, brush 1 station 120, and brush 2 station 130. Only after being brushed and rinsed can this type of wafer then be spun and dried. The spun and dried wafer is then moved to the output station 150.

In output station 150, the clean wafer is put into a cassette 181. Wafer 105 represents a clean wafer being put into cassette 181. The cassette 181, when full of clean wafers, can then be removed by the operator. This completes the cleaning process.

Control system housing 170 houses a number of components that comprise the heart of the control system for the scrubber. Control system housing 170 includes a host cage 171 having a host board 172. The host board 172 provides the overall control for the scrubber. The host board 172 typically includes one or more host processors implemented in one or more physical packages. The host board 172 can include a board from Gespac, Inc., of Scottsdale Ariz. (a Motorola 68030 based processor board, part number MPU-3OH8). The host cage 171 provides support for the host board 172 and other boards in the host cage (e.g. sensor input boards, a video card for operator display 160, a board for communicating signals from the host board 172 to the rest of the control system).

The host board can communicate to the rest of the control boards through another board in the host cage 178, or through a connector directly to the host board 172. A control board is typically a modular circuit formed on a printed circuit board, that controls motors or other devices within a scrubber. Typically, the communications from the host cage pass through a communications board 178 (described below). The communications board, in turn, communicates with other devices through a bus 177.

Bus 177 supports an easily extensible and modular control system. In the scrubber of FIG. 1, the bus 177 links the host board 172, the communications board 178, the stepper motor backplane 175 and the DC motor backplane. Messages between the various devices attached to the bus 177 can be communicated according to a protocol described below. A message is a packet of information to be communicated from one point to another point.

The stepper motor backplane 175 supports a stepper motor control board 176. This stepper motor control board 176 controls the movement of stepper motor 191 via stepper motor bus 192. Similarly, the DC motor backplane 173 supports a DC motor control board 174. The DC motor control board 174 controls the movement of the DC motor 193 via DC motor bus 194.

In one embodiment of the present invention, each of these backplanes support up to four motor control boards. However, one of ordinary skill in the art would understand that the present invention is not limited to backplanes that support only four motor control boards.

Operator display 160 typically includes a monitor like a cathode ray tube, or flat panel display. In one embodiment, operator display 160 also includes a touch sensitive screen allowing the operator to interact with the scrubber control system.

Note that FIG. 1 is a conceptual drawing. Some components are represented by one symbol so as to not overly obscure the present invention. For example, it is possible to have transport belt 3 117 be made of two or more physical transport belts, each belt being moved by a different DC motor.

Further detail on scrubbers can be found in the patent application entitled, "Substrate Processing System," by Thrasher, et al., serial number not yet assigned, assigned to the assignee of the present invention.

CONTROL SYSTEM HARDWARE OVERVIEW

Figure 2:
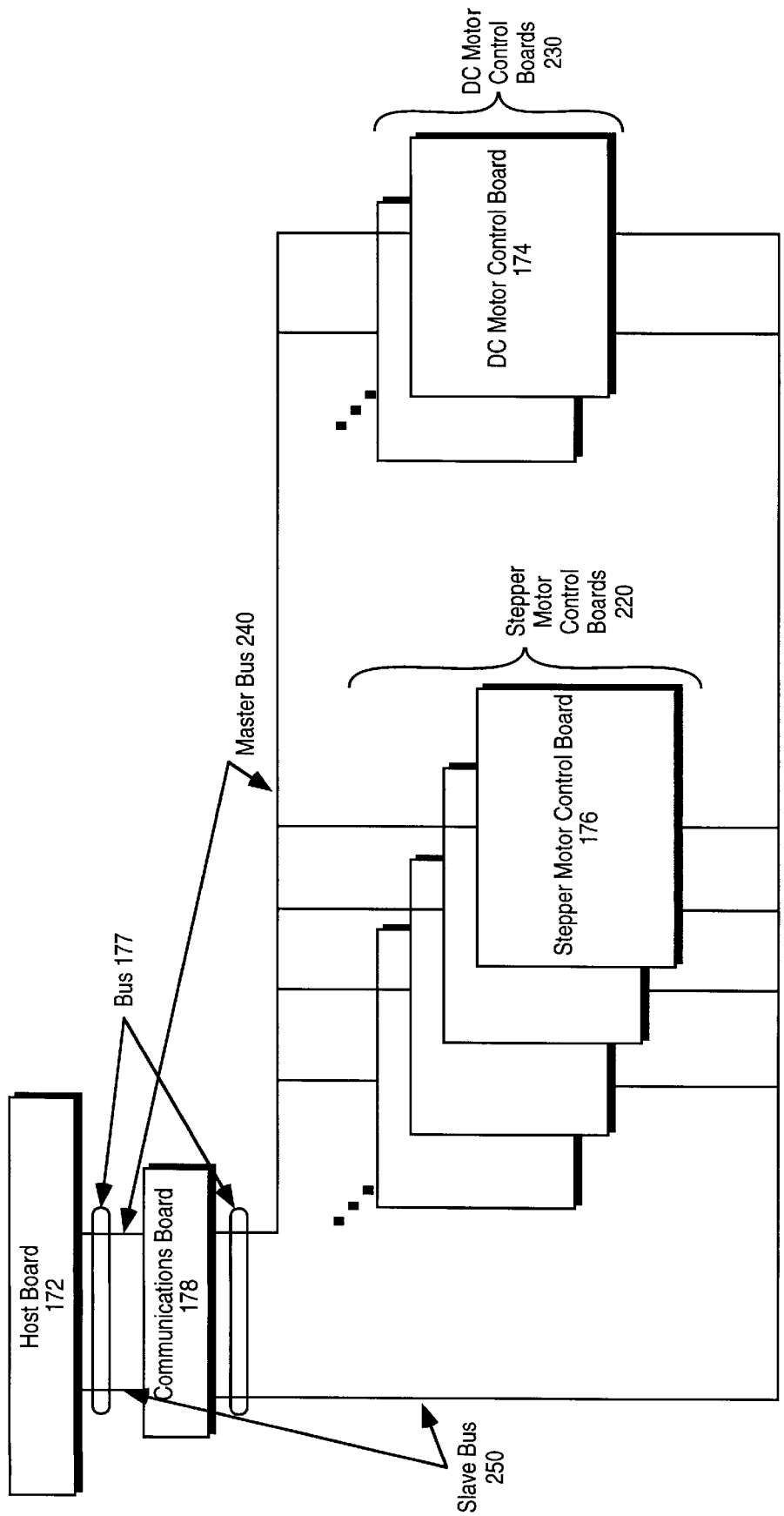
FIG. 2 illustrates a conceptual view of some of the hardware of the control system of the double sided wafer scrubber of FIG. 1.
Figure 3:
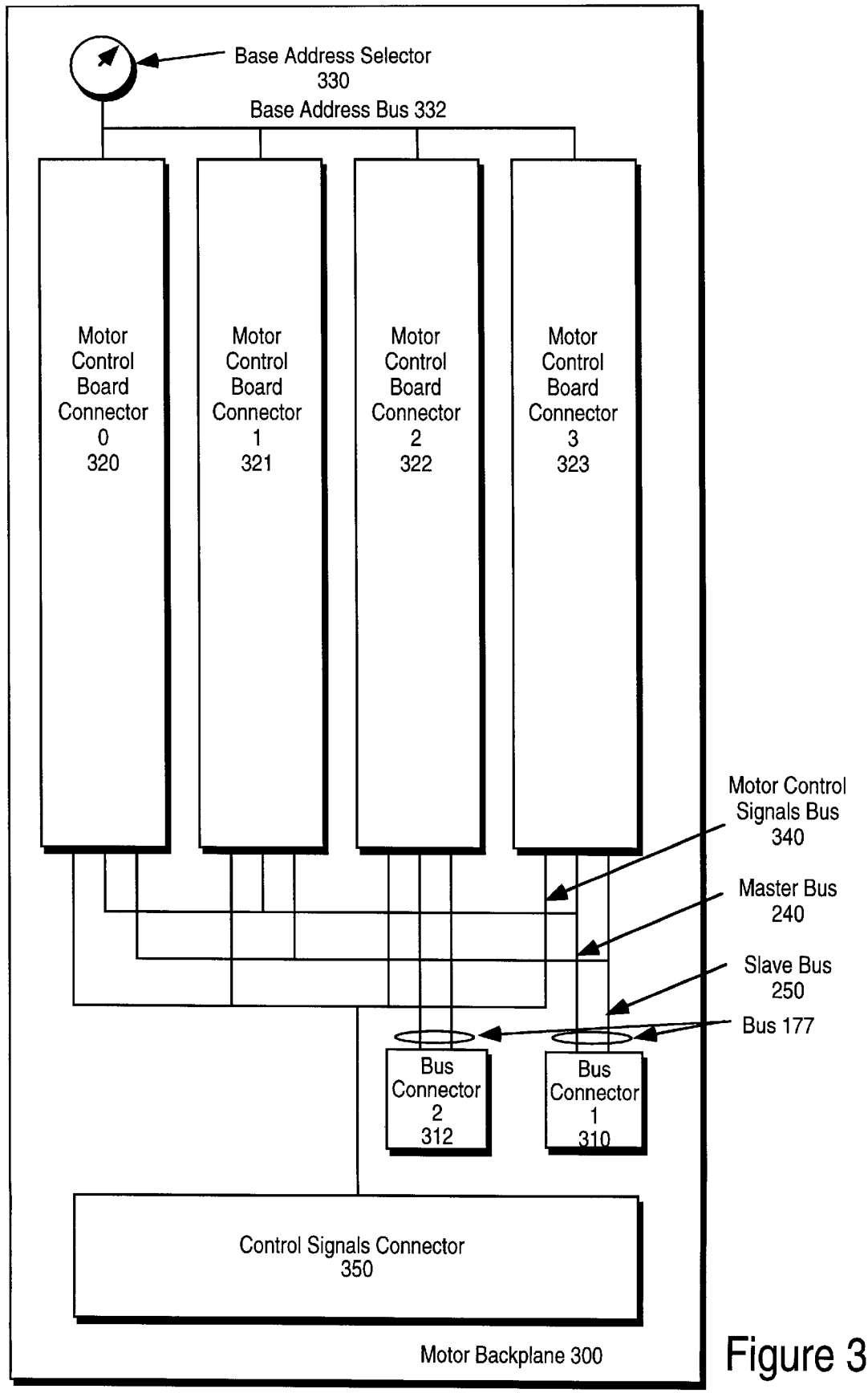
FIG. 3 illustrates a view of a motor control backplane, or motor backplane.

FIG. 2 illustrates a conceptual view of some of the hardware of the control system of the double sided wafer scrubber of FIG. 1. The control system provides higher repeatability, reliability and extendibility than the prior art scrubber control systems.

The host board 172 primarily communicates with the rest of the devices in the control system via bus 177. (Note that it is possible that some sensors and other devices can communicate to the host board 172 through boards in the host cage 171.) Bus 177 is comprised of a master bus 240 and a slave bus 250.

The host board 172 transmits messages to slave devices (e.g. stepper motor control boards 220 and DC motor control boards 230) via the master bus 240. All slave devices listen to the master bus 240 all the time. Each slave device has at least one corresponding address. If a message is addressed for a particular slave, then only that particular slave will act upon the contents of the message. The other slaves will ignore messages not addressed for them. The slave devices transmit messages to the host board 172 via the slave bus 250. This ensures that messages from the host board 172 will never collide with a message from the slave boards. Therefore, the slaves do not require collision detection circuits for receiving messages on master bus 240.

Note that slave messages can collide, corrupting the contents of the messages. Messages can also be corrupted by other factors, like power surges. Therefore, each message sent on bus 177 includes a checksum. The checksums help in the detection of a corrupted message.

In one embodiment, bus 177 is implemented using the IEEE RS-485 standard. In another embodiment, an IEEE RS-422 standard implementation is used. Using the RS-422 standard allows the scrubber to be controlled over distances of more than 1000 feet. This greatly increases design flexibility and reduces wiring costs when compared to traditional designs. However, these standards can have a relatively low limit for the number of devices that can be connected to the bus. Therefore, in one embodiment of the present invention, using standard TTL logic, bi-directional repeaters are inserted in the bus 177. The repeaters provide a low cost solution to ensuring that many devices can be placed on bus 177.

Typically, two lines are used for each of the master bus 240 and the slave bus 250. Therefore, a communications medium for bus 177 can be standard four wire telephone cable. Connectors between various devices on the bus 177 can be RJ-11 jacks. In one embodiment, RJ-12 jacks are used with six wire telephone cable to provide for further expansion of the control system. The use of telephone cable to for the communications medium allows technicians to more easily build, test and repair scrubber control systems.

As mentioned previously, a communications board 178 can be coupled to the host board 172 to provide important testing and repair access to bus 177 by a technician. That is, communications board 178 provides an external communications link to the scrubber's control system. Further, communications board 178 can provide alternative methods of coupling the host board 172 to the devices. For example, the medium from the host board 172 to the communications board can be a special Gespac cable and connector, while the medium from the communications board 178 to the slaves can be the RS-485 connections. Typically two kinds of slave devices are ultimately coupled to the host board 172 by bus 177: stepper motor control boards 220, and DC motor control boards 230. A stepper motor control board 176 can be used to control one or more specific stepper motors. A DC motor control board 174 can be used to control one or more specific DC motors. If more of either kind of motor is needed in a scrubber, for example, as a modification of a present scrubber design, then more motor control boards can be added to the control system. This modularity makes designing and pricing these modifications much easier.

MOTOR BACKPLANE

Motor control backplanes, or motor backplanes, provide some of the packaging advantages of one embodiment of the present invention. FIG. 2 illustrates a conceptual view of some of the hardware of the control system of the double sided wafer scrubber of FIG. 1. Each motor backplane serves as a medium for distributing access to bus 177 to one or more motor control boards. Further, each motor backplane concentrates motor control signals (or commands) for one or more motors into a single connection. These features reduce wiring complexity, improves the manufacturability of the control system, and makes repairing portions of the control system much simpler.

Each motor backplane has at least one bus 177 connector. The motor backplane 300 has two such connectors: bus connector 1 310 and bus connector 2 312. Bus connector 1 310 can be connected to the bus connector 2 312 of another motor control backplane. This allows the motor backplanes to be daisy chained. Each bus connector includes wires for both the master bus 240 and the slave bus 250. The motor backplane couples these busses with each of the motor control board connectors 320–323. Therefore, each motor control board connected to motor backplane 300 will have access to bus 177.

Each motor control board connector 320–323 is connected to the motor control signals bus 340. Motor control signals bus 340 typically includes a number of different control lines for each motor control board connector 320–323. Motor control signals bus 340 carriers control signals to one or more motors.

In one embodiment of the present invention, two types of motor backplanes are supported: stepper motor backplanes, and DC motor backplanes. For a typical stepper motor backplane, motor control signals bus 340 includes four groups of motor control signal wires for each motor control board connector. Therefore, 16 groups of motor control signal wires are supported (controlling 16 different stepper motors). The motor control signals bus 340 concentrates the motor control signals into a control signals connector 350. This makes wiring of the control system much simpler.

For a DC motor backplane, control signals connector 350 includes a number of connectors for connecting to eight DC motors. Control signals from DC motor control boards are transmitted to DC motors through control signals connector 350. Signals from the DC motors are received at the connector and transmitted to the appropriate DC motor control board connected to one of the motor control board connectors 320–323.

Motor backplane 300 has a base address selector 330. Base address selector 330 allows a technician to select a base address for a motor backplane. All motor control boards have access to this base address selector 330 via base address bus 332. This allows each motor control board to easily determine its address on bus 177.

The advantage of the base address selector 330 is that the technician need only select a base address for the motor backplane 300. Because the motor control boards can access the base address selector 330 and self configure themselves, the technician does not have to program a base address for each motor control board on bus 177.

In one embodiment of the present invention, a motor backplane 300 supports up to four motor control boards.

However, it would be clear to one of ordinary skill in the art that more or less motor control boards can be included on a motor backplane. Note that it is preferable that the number be in the set $2^n$, where $n \geq 0$, because this makes the base address selection more efficient.

Although the motor backplane 300 has been described in detail, in one embodiment of the present invention, motor backplanes are not required. Much of the functionality of the backplane would then be incorporated directly on the motor control boards (e.g. base address selection, control signals connector, bus 177 connectors).

STEPPER MOTOR CONTROL BOARD

Figure 4:
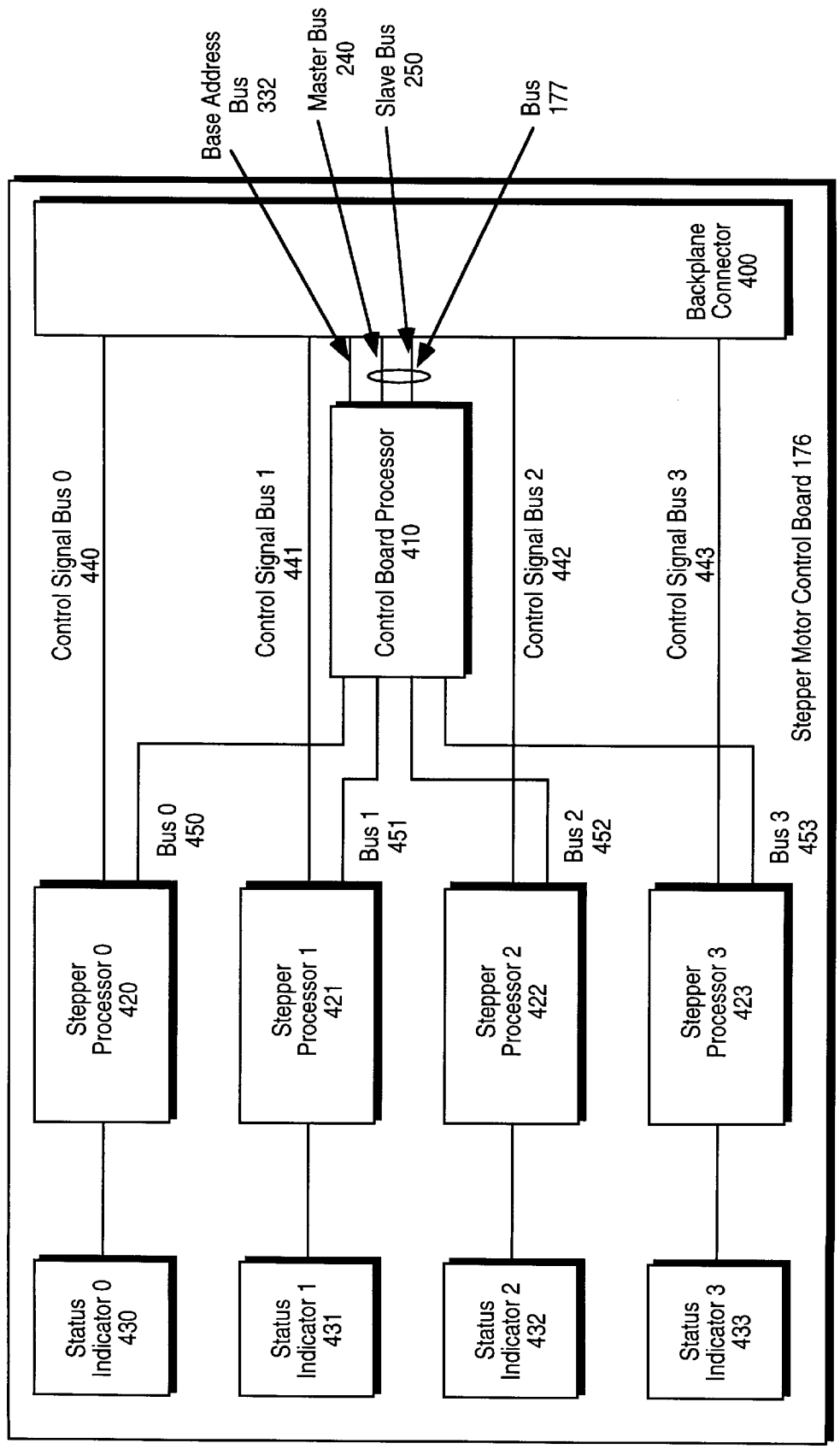
FIG. 4 illustrates a view of a stepper motor control board.

FIG. 4 illustrates a view of a stepper motor control board 176. The stepper motor control board 176 receives messages from the host board 172, decodes these messages, ensure that particular stepper motors act in response to these messages, and acknowledge the receipt of these messages.

Stepper motor control board 176 includes: a backplane connector 400 for connecting to a stepper motor backplane; a control board processor 410; a number of steppers processors 420–423; and a number of status indicators 430–433.

The control board processor 410 can determine its base address from the base address bus 332 and from the control board connector 320–323 number that the stepper motor control board 176 is plugged into. Further, control board processor 410 communicates over bus 177. Control board processor 410 receives and unpackages messages from master bus 240. These messages may be addressed to the control board processor 410 (e.g. perform a control board self test, or provide the host board 172 with the version number of the stepper motor control firmware) or to a particular stepper processor 420–423 (e.g. move stepper motor 0). In one embodiment, the control board processor 410 includes a memory and a processor. Motorola, of Texas, supplies such a part (68HC711E9).

One embodiment of the present invention differs from the control system of previous scrubbers in that prior art stepper motors were driven directly from inside the control system housing 170. However, the stepper motor signals interfered with other command and control signals. The present embodiment improves on the prior art by reducing the possibility of interference from controlled stepper motors.

Control board processor 410 issues messages to the stepper processors 420–423 over buses 450–453 respectively. The stepper processors 420–423 transmit control signals over control signal busses 440–443 respectively. (Such stepper processors can be bought from Cybernetic Micro Systems of San Gregoria, Calif., part number CY545.) To cause stepper motor 191 to move, for example, a stepper processor 0 420, controlling stepper motor 191, will transmit a control signal to the stepper motor 191 including a number of pulses and the direction. The stepper motor (and a power driver) converts the control signals into a rotation. This will cause the upper brush of brushes 131 to raise or lower accordingly. Stepper motors can be obtained from Oriental Motor Inc., of San Jose, Calif. Power drivers that convert the number of pulses and the direction of the move into a rotation can be obtained from Semix Inc. of Fremont Calif.

Status indicators 430–433 indicate when a particular motor is being moved. This can be very helpful when testing a scrubber control system. The status indicators 430–433 are positioned at the end of the stepper motor control board 176 so that a technician can easily see if a particular motor should be moving. Typically, the status indicators are LEDs. Either the individual stepper processor 420 or the control board processor 410 can control these status indicators 430–433.

DC MOTOR CONTROL BOARD

DC motors are used to rotate brushes, rotate wafers while being brushed, and move transport belts in a scrubber. In the prior art scrubbers, DC motor control used a tachometer. However, this could cause a DC motor to drift to +−3% of the required speed. Further, the DC motor control boards required calibration. If calibration of the DC motor with the tachometer was not correct, then it would be very difficult to achieve the required DC motor speeds. For customers requiring high degrees of repeatability, one embodiment of the present invention reduces the drift of the DC motor speed and removes the requirement of DC motor control board calibration.

Figure 5:
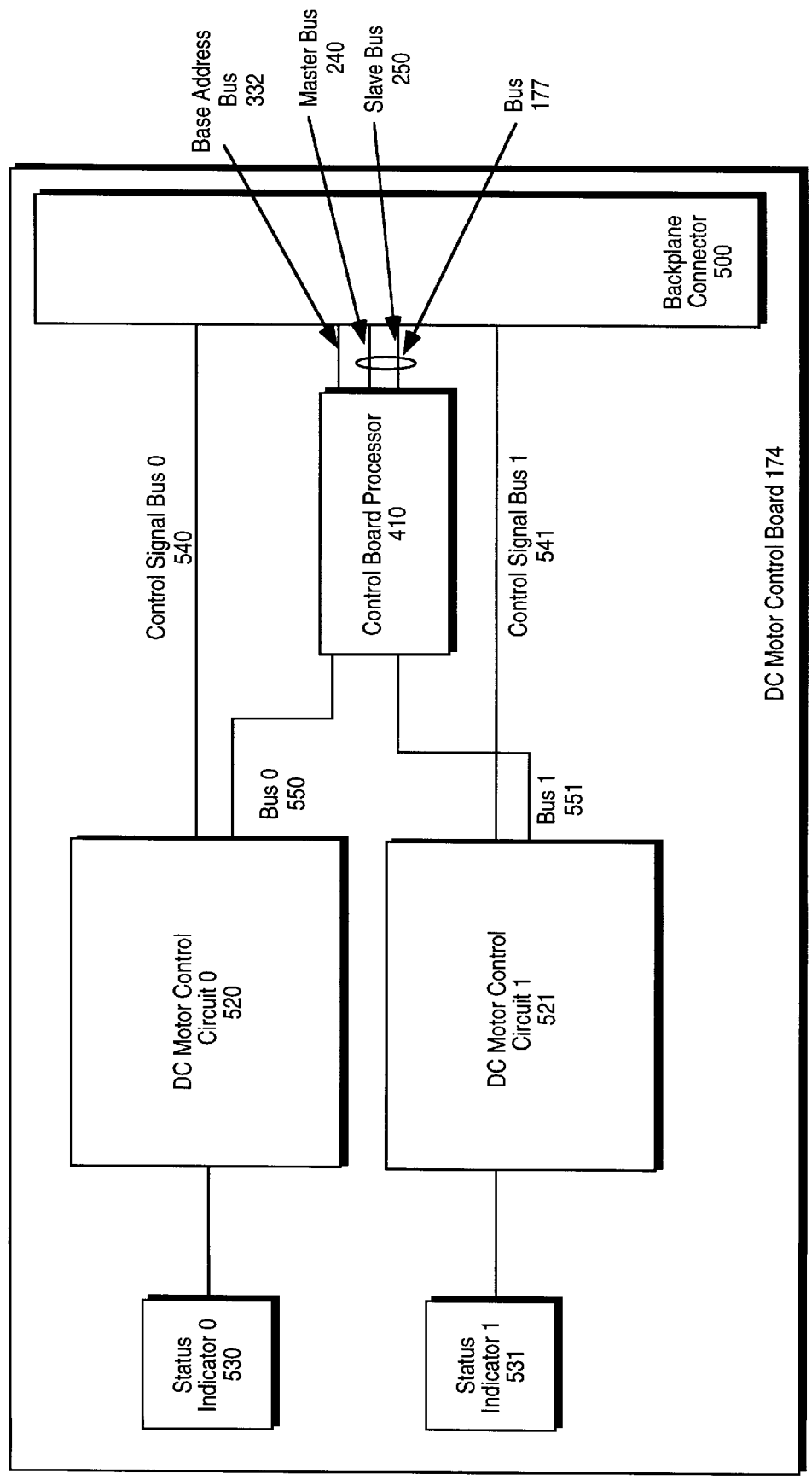
FIG. 5 illustrates a view of a DC motor control board.

FIG. 5 illustrates a view of a DC motor control board of one embodiment of the present invention. Like the stepper motor control board 176, DC motor control board 174 receives message from the host board 172, decodes these messages, ensures that a particular DC motors act in response to these messages, and responds to these messages if necessary.

DC motor control board 174 includes a control board processor 410, a backplane connector 500, DC control circuits 520-521, and status indicators 530-531. Control board processor 410 is physically the same as the control board processor used in the stepper motor control board 176. Only the software has been changed.

Backplane connector 500 includes connections for controlling DC motors, rather than connections for controlling stepper motors, as in backplane connector 400.

DC control circuits 520-521 are for controlling two separate DC motors. For example, DC control circuit 0 520 can be used for controlling transport belt 1 115.

The present invention uses optical phase encoding as a feedback device, to control the DC motors. This removes the need to perform the calibration requirements of prior art scrubbers. Although optical phase encoding has been used to control DC motors, this type of control is new to double sided wafer scrubbers. In optical phase encoding, DC control circuit 0 520 receives a certain number of pulses, over control signal bus 0 540, per revolution of the DC motor. In one embodiment, 2000 pulses are received per revolution. Therefore, the RPM of the motor can be controlled much more accurately because the DC motor control circuit can count the number of pulses received in a time period. If the desired RPM is not being achieved, then the DC motor control circuit can adjust the power being supplied to the DC motor.

The status indicators 530-531 operate much like the status indicators 430–433 on stepper motor control board 176.

Providing improved DC motor control reduces a significant problem in the cleaning of semiconductor wafers. By being able to accurately control the speed of the DC motors in the scrubber, the possibility of a wafer skidding is reduced. A wafer will skid when one transport belt is moving at a different speed from the next transport belt. As the wafer moves from the first transport belt to the second transport belt, the difference in belt speeds will cause the wafer to skid. This can create particles from the belts, a very undesirable result in semiconductor manufacturing equipment including scrubbers.

COMMUNICATIONS BOARD

Figure 6:
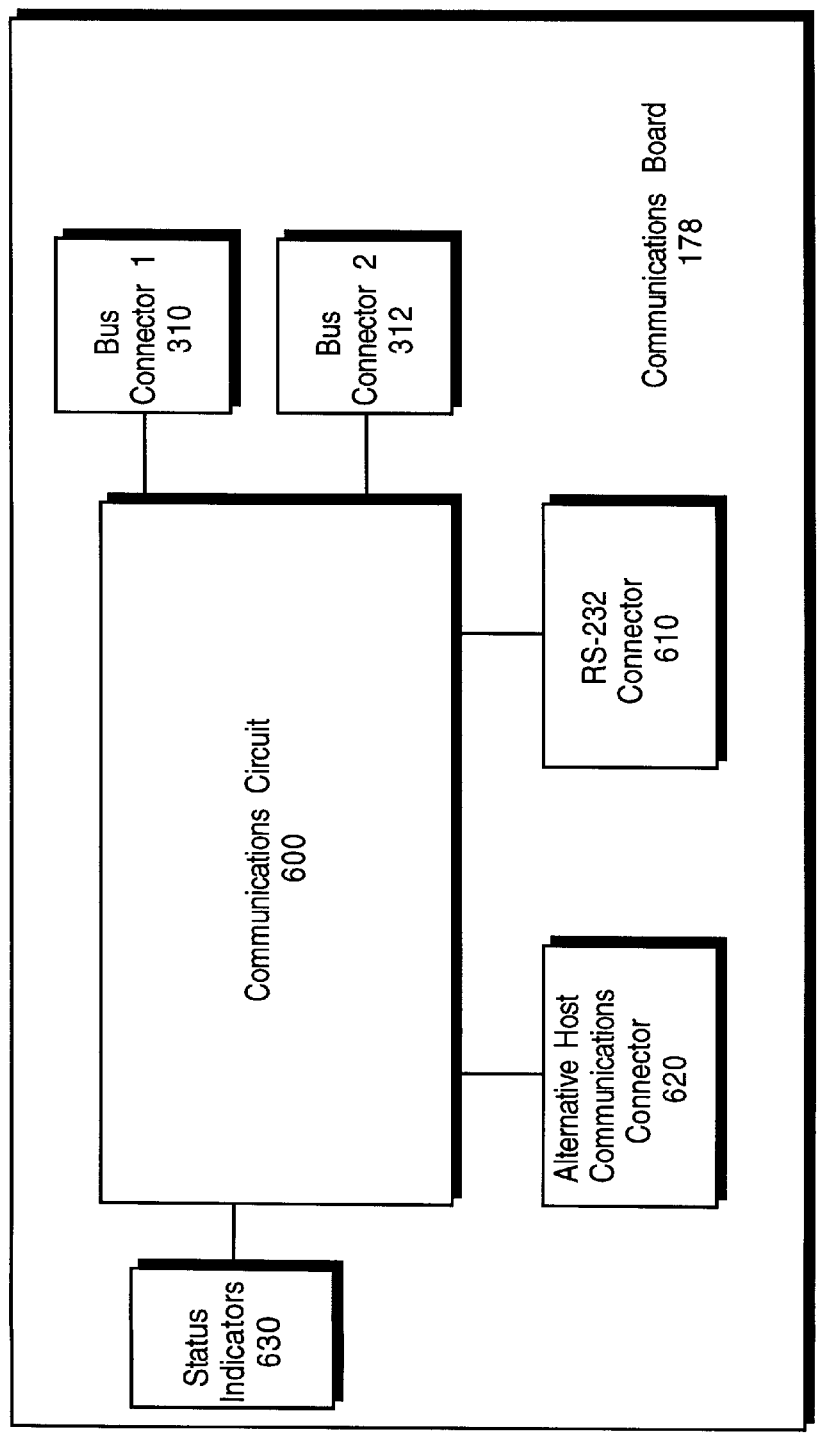
FIG. 6 illustrates a view of a communications board.

FIG. 6 illustrates a view of a communications board. The communications board 178 provides technicians with easy access to bus 177.

Communications board 178 includes: a communications circuit 600; status indicators 630; bus 177 connectors (bus connector 1 310 and bus connector 2 312); an RS-232 connector 610 and an alternative host communications connector 620.

Communications circuit 600 connects to, and controls, all the other devices on the communications board 178. Status indicators 630 indicate the status of the master bus 240 and the slave bus 250. Status indicators 630 indicate when the two busses are busy communicating data.

RS-232 connector 610 can be used, for example, by a technician to connect to bus 177 using a laptop computer. The technician can monitor the messages being sent on bus 177, monitor messages, or initiate his/her own messages. Thus, a technician can easily send a message to a particular motor control board to cause a particular motor to move, or stop moving. This feature decreases the amount of time testing each scrubber and reduces the amount of time needed to repair a scrubber. Of course one of ordinary skill in the art would understand that other types of connectors and communications protocol can be supported, such as Ethernet, RS-422. The communications circuit 600 translates the protocols between the RS-232 connector 610 and the bus 177.

Alternative host communications connector 620 provides an alternative connection from the host board 172 to the communications board 178. In one embodiment, this connection connects directly to a Gespac host board 172 using TTL voltage level asynchronous communications. In this embodiment, there is no need to translate +12/−12 volt RS-232 levels to TTL voltage levels.

CONTROL SYSTEM PROCESSES

Figure 7:
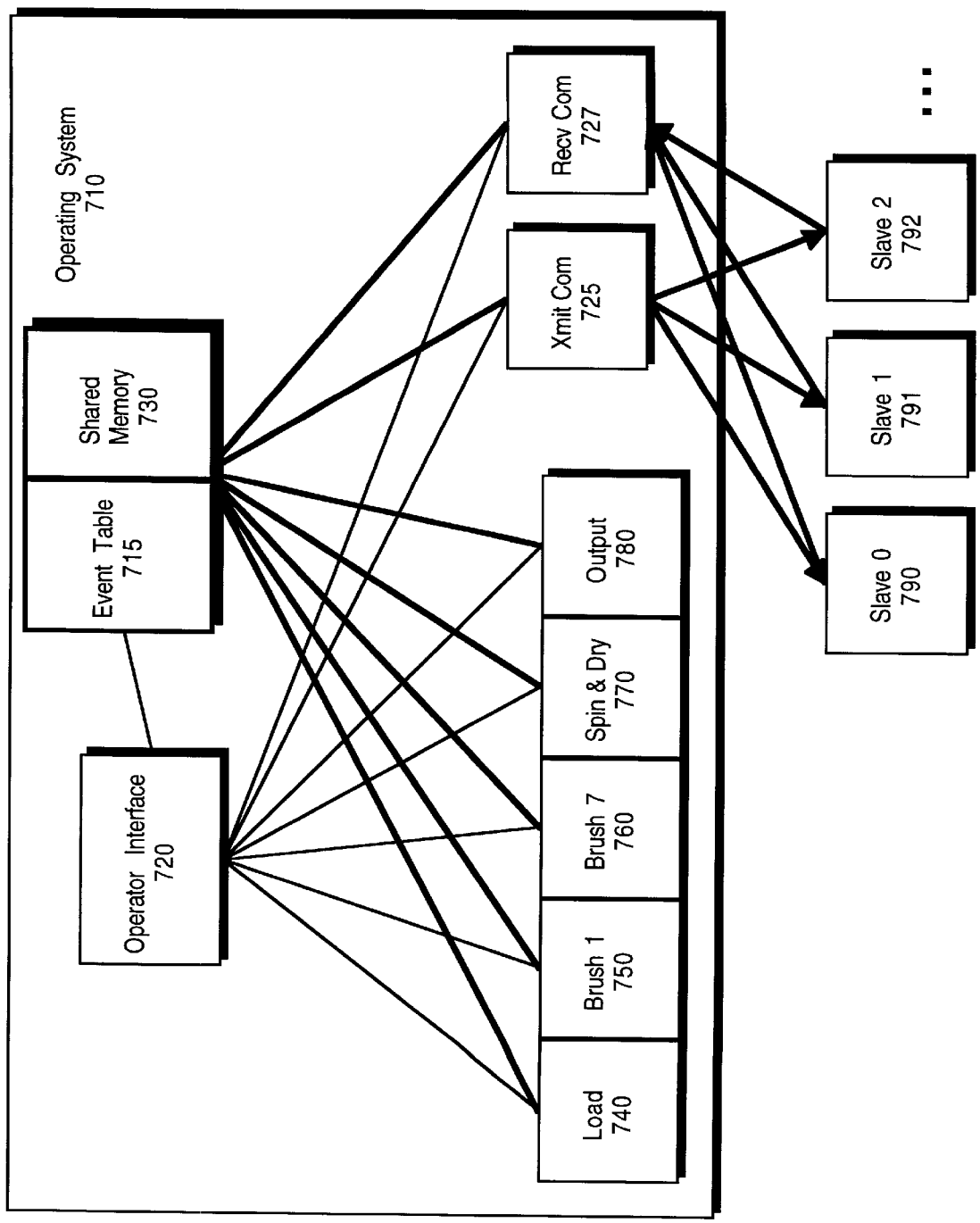
FIG. 7 illustrates a conceptual view of the control system processes of the double sided wafer scrubber of FIG. 1.

FIG. 7 illustrates a conceptual view of the control system processes of the double sided wafer scrubber of FIG. 1. The host board 172 executes a number of station processes under the operating system 710. The slave processes 790–792 are examples of processes running on other devices communicating to the host board 172 over bus 177. Before describing FIG. 7 in detail, an overview of an operating system of one embodiment is presented.

OPERATING SYSTEM OVERVIEW

In one embodiment of the present invention, the OS-9 operating system is used in the control system. OS-9 can be obtained from Microware Systems Corporation, Des Moines, Iowa. Specific information on OS-9 can be found in Dibble, P. C. OS-9 *Insights: An Advanced Programmers Guide to OS-9, 2nd Edition*, Des Moines. Iowa, Microware Systems Corporation, 1992; and in, *OS-9 Training and Education Manual: Intermediate OS-9 Topics*, Des Moines, Iowa, Microware Systems Corporation, 1992. Other operating systems can be used (for example, Unix, DOS, OS/2) that support signaling mechanisms and mechanisms for scheduling tasks.

OS-9 is a multi-tasking operating system. OS-9 allows two, or more, independent programs, called processes or tasks, to execute simultaneously. OS-9 supports re-entrant program code. That means that the code is not self modifying. This allows two or more different processes to share one copy of some program code simultaneously.

The OS-9 kernel provides basic system services, like I/O management (used in communicating messages), process control, and resource management.

Programs, like the control system for the scrubber, are made from a number of modules. Each module is a logical, self-contained program code, program code segment, or collection of data. Each module includes a module header, a module body, and a CRC (Cyclic Redundancy Check) value. The module header includes a module's name, size, type, and language. The module body includes initialization data, program instructions, constant tables, etc. The CRC is three bytes used to verify the module's integrity.

There are typically two types of modules: executable modules and data modules. The executable module is a module containing program code. Typical executable modules include initialization routines, interrupt routines, and a main loop. In one embodiment of the present invention, a typical initialization routine initializes all the parts of a scrubber station. For example, the initialization routine for the brush 1 station 120 resets the brush motors and water jets. The interrupt routines are used to process interrupt signals. The main loop typically includes all the steps needed to perform the tasks for one part of the cleaning process. A data module is a module that enables multiple processes to share a data area and to communicate data among themselves.

An OS-9 process is an executing program. Once created, a process has a state. The state can be active, waiting, or sleeping. Active means that the process wants processor time. Waiting means that the process will wait for another process to stop, or until the process receives a signal. Sleeping means that the process will wait for a specified time period or until a signal is received.

New processes are placed in a process queue. The process queue is used by the operating system to determine the state of a process.

Processes can communicate information among themselves using signals, events, or by accessing shared data areas. A signal is an intentional disturbance in the system (also referred to as software interrupts).

CONTROL SYSTEM PROCESSES DETAIL

Referring to FIG. 7, the control system is implemented on top of operating system 710. In one embodiment, operating system 710 is the OS-9 operating system. The control system includes a number of processes.

To handle I/O, and other signals, the operation system 710 includes an event table 715. The event table reflects whether any work must be done by a particular device. Processes can access these events and cause the corresponding devices to act accordingly. Examples of the use of event table 715 are described below.

The first process used in the control system is an operator interface 720. Operator interface 720 is a process used by the operator to control the scrubber. The operator interface 720 presents display information for operator display 160, and starts a number of station processes.

Load 740 is a station process that controls the operation of the load station 10. One of the more important features of the load 740 is that it ensures that wafers are accessed from the cassette at the correct time. For example, load 740 ensures that wafer 101 is transferred from cassette 180 at the correct time for brush 1 station 120 to accept the wafer.

Brush 1 750 is a station process that controls brush 1 station 120. Brush 1 750 causes the brushes 121 to brush and to rotate the dirty wafer 102. Therefore, brush 1 750 must control motors to rotate the brushes, motors to adjust the height of the brushes, and motors used to rotate the wafer.

Brush 2 760 is a station process that controls brush 2 station 130. Brush 2 station 130 operates in a manner similar to brush 1 750.

Spin & dry 770 is a station process that controls spin & dry station 140. Spin & dry 770 ensures that wafer 104 is first rinsed, spun, and then dried.

Output 780 is a station process that controls output station 150. Output 780 ensures that wafer 105 is load properly into cassette 181.

Each of the station processes share data with the operator interface 720 using shared memory 730. Typically, shared memory 730 is a data module that is loaded like the other modules. The other processes link to the shared memory 730. In one embodiment, the other processes have direct access to the data held in shared memory 730. The data stored in shared memory 730 is discussed in greater detail below.

Slave processes 790–792 represent processes executing on other processors in the control system (e.g. stepper processor 0 420). These slave processes 790–792 are responsible for executing messages received from the host board 172 (through xmit com 725).

Xmit com 725 is a process used to transmit messages from the station processes to the slave processes. Recv com 727 is a process used to receive messages from the slave. Xmit com 727 and recv com 727 are described in greater detail below.

XMITCOM PROCESS

Figure 8:
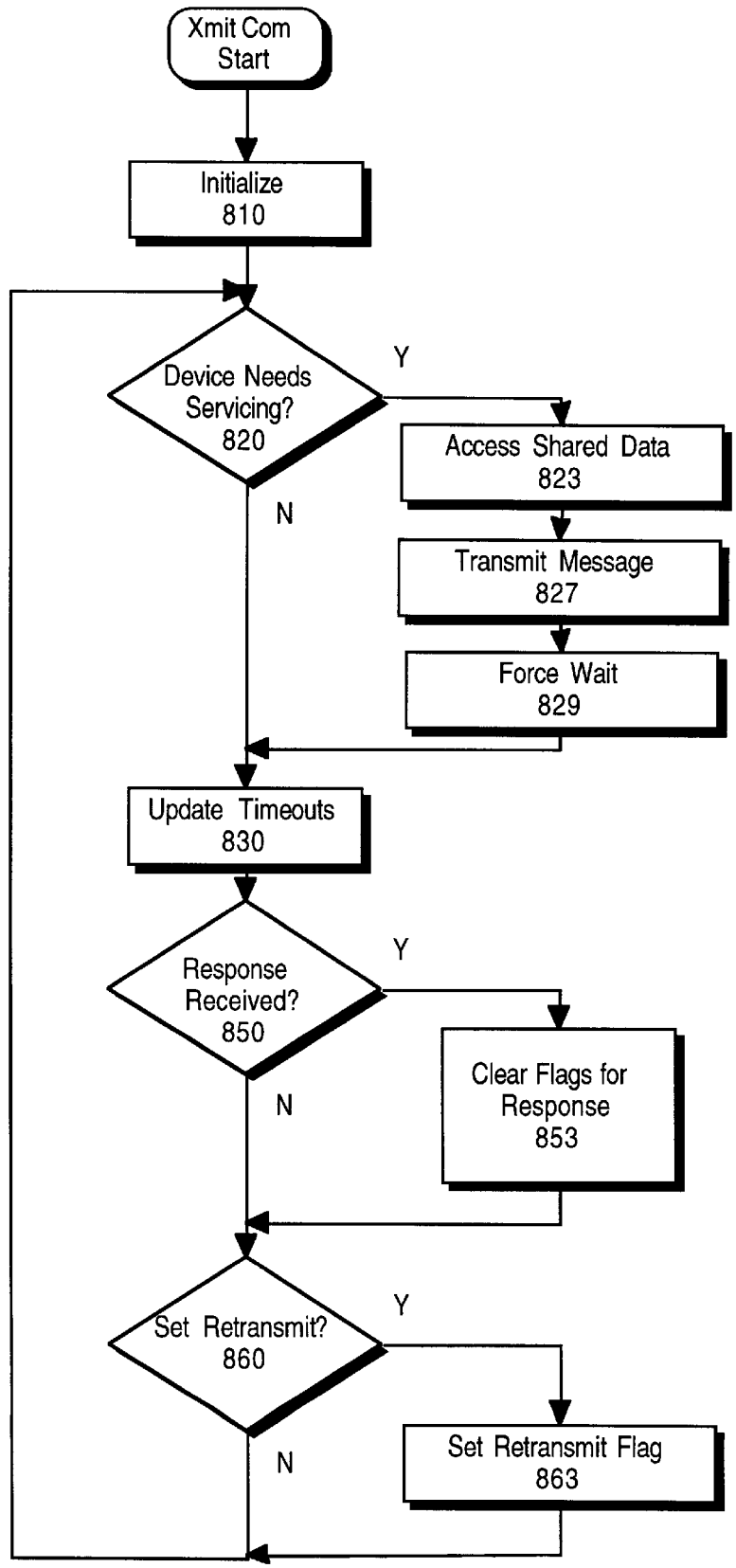
FIG. 8 is a block diagram of the steps performed by the xmit com process of FIG. 7.

FIG. 8 is a block diagram of the steps performed by xmit com 725. Xmit com 725 is responsible for transmitting messages for station processes to the devices in their respective scrubber stations.

At step 810, xmit com 725 is initialized. This includes connecting to the shared memory 730.

At step 820, xmit com 725 checks whether any device needs servicing. This is done by checking the event table 715. Events in the event table are set by station processes or by the operator interface 720.

If an event exists in the event table 715, then xmit com 725, at step 823, accesses corresponding information from the shared memory 730. This information will indicate the type of message to be sent, and what kind of data to send. Then, at step 827, xmit com 725 prepares and transmits the message to the appropriate slave. Optionally, at step 829, xmit com 725 will force a wait (discussed below). If no event exists in the event table 715, then xmit com 725 proceeds to step 830.

At step 830, xmit com 725 updates the status of timeouts for previously sent messages for which there are still pending responses. In one embodiment of the present invention, xmit com 725 decrements a timeout value for every execution of step 830 in which a previously sent message has not received an expected response. In one embodiment, the timeout values for previously sent messages is stored in the shared memory 730. Although these timeout values are local to the xmit com 725 process, by putting these variables in shared memory, a technician can more easily view the status of the control system.

At step 850, xmit com 725 checks the shared memory 730 to determine whether a response message has been received. If a response has been received, then at step 853, the response pending flag for that message is cleared from shared memory 730. A response pending flag is typically a bit indicating that a response is expected.

Next at 860, xmit com 725 checks whether any responses are pending for a particular slave device and whether the timeout for that pending response has expired. Remember that control boards (executing slave processes) do not typically include any collision detection circuits. Therefore, the present control system must cause a retransmission of a message from the host where a problem occurs with a slave's message. If a retransmit is required, then at step 863, a retransmit flag is set. This will cause, at step 820, a retransmission of the previously sent message to the slave device.

The order of occurrence of step 820, step 830, step 850, and step 860, is not necessarily required to be in the order presented. In other embodiments, these steps can occur in a different order. However, in one embodiment of the present invention, where xmit com 725 sleeps at the end of each iteration of steps 820–863, the ordering of some of the steps has significance. In this embodiment, it is desired that xmit com 725 execute steps that are the most likely to require additional processing, before the other steps. In this embodiment, each step of step 820, step 850, and step 860 is executed as a series of tests. In one embodiment, we have determined that step 820 is the most likely step to require additional action (steps 823–829). The next most likely step to require processing is step 850. Finally, step 860 is the least most likely step to require processing. By performing steps that are more likely to require processing first, the apparent responsiveness of xmit com 725 can be improved.

In one embodiment of the present invention, the retransmission of relative move messages is not allowed. A relative move message is used, for example, to cause a stepper motor to move a particular distance in a particular direction. This is different than an absolute move where the stepper is to move to an absolute location. In this embodiment, if relative move messages were retransmitted, then a relative move may be incorrectly repeated. This can occur, for example, where a relative move message is received by a slave, but the slave's acknowledge message collides with a second slave's acknowledge message. Xmit com 725, not receiving the slave's acknowledge, would retransmit the relative move message. By prohibiting the retransmission of relative move messages, stepper motors, for example, will not incorrectly repeat the same relative move.

As mentioned above, at step 829, the xmit com 725 can force a wait effectively blocking many of the other processes from executing for a short period of time. This helps prevent a collision between slave messages. In one embodiment of the present invention, xmit com 725 executes an OS/9 system call of tsleep(1). tsleep(1) causes the xmit com 725 process to be put on the top of the process queue. Therefore, on the next available time slot for the host board 172 processor, xmit com 725 will execute again. This prevents most other processes from forcing an event that will cause the transmission of a message to a slave. For example, assume that a tsleep(1) provides a slave with approximately 10 msec to respond (approximately twice as long as is may be needed for a message to be sent and an acknowledge to be received). Because not more than one slave message will be sent in a 10 msec time period, no two slave devices will have a chance to contend with the slave bus 250.

RECV COM PROCESS

Figure 9:
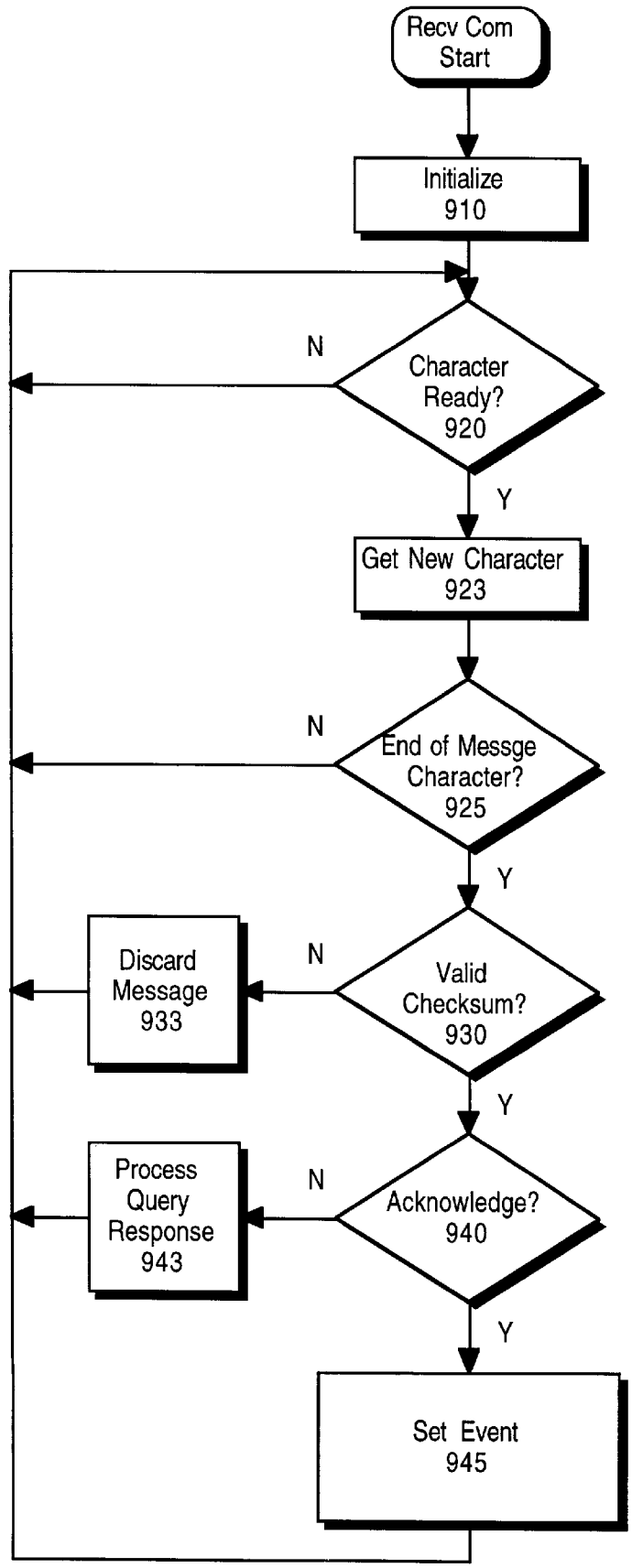
FIG. 9 is a block diagram of the steps performed by the recv com process of FIG. 7.

FIG. 9 is a block diagram of the steps performed by recv com 727 of FIG. 7. Recv com 727 is responsible for receiving messages from the slave bus 250.

At step 910, recv com 727 is initialized. This involves accessing the event table 715 and the shared memory 730.

At step 920, recv com 727 checks whether a character has been received by the operating system 710. If no character has been received, recv com 727 goes back to step 920.

If a character is received at step 920, then, at step 923, recv com 727 gets the new character and stores this character.

Then, at step 925, the newly received character is tested to determine whether the character is an end of message character. In one embodiment, this is the ASCII character for a carriage return. If the newly received character is not an end of message character, then recv com 727 starts at step 920 again.

If the new received character is an end of message character, then at step 930, the checksum for the message is checked. If the checksum is not valid, then, at step 933, the stored message is discarded.

If the checksum is valid, then at 940, the type of message received determines the next action. If the received message is a response to a query then, at step 943, appropriate measures are taken. If the received message is an acknowledge then, at step 945, an event is set indicating that a response was received for a particular slave device.

SLAVE PROCESS

Figure 10:
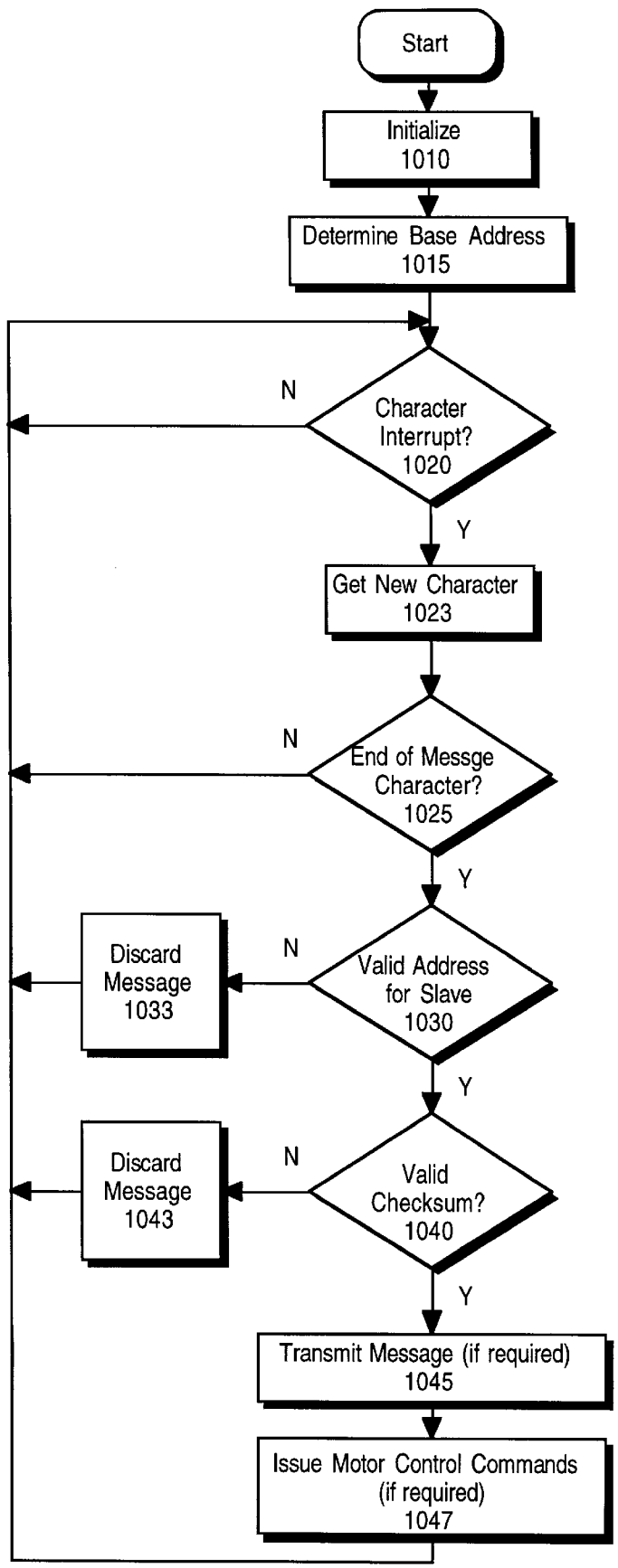
FIG. 10 is a block diagram of the steps performed by a slave process of FIG. 7.

FIG. 10 is a block diagram of the steps performed by a slave process of FIG. 7. Each slave process corresponds to a device in the scrubber.

At step 1010, the slave process is initialized. This can include performing a self test.

At step 1015, the slave process determines what its base address is. For processes executing on control board processor 410, this can be done by accessing the base address bus 332 and by determining to which motor control board connector the motor control board is connected.

Steps 1020–1025 are similar to corresponding steps in FIG. 9.

At step 1030, the address of the message is tested by the slave process. Each slave attached to the master bus 240 listens to every message communicated on the mater bus 240. At step 1030, each particular slave process determines whether the message is for that slave. In one embodiment of the present invention, control board processor 410 determines whether the message is addressed to any of its DC motor control circuits (or stepper processors). If the message is not destined for a particular slave process, then that slave discards the message at step 1033.

At step 1040, the checksum for the message is tested. If the message was corrupted, by noise for example, then, at step 1043, the message is discarded.

At step 1045, the slave transmits an acknowledge message on the slave bus 250. This only occurs if such an acknowledge is required.

At step 1047, the slave issues messages to the motor control circuits (or stepper processors) in response to the received message. This is done only if the message requires such action.

EXAMPLE COMMUNICATIONS

Figure 11:
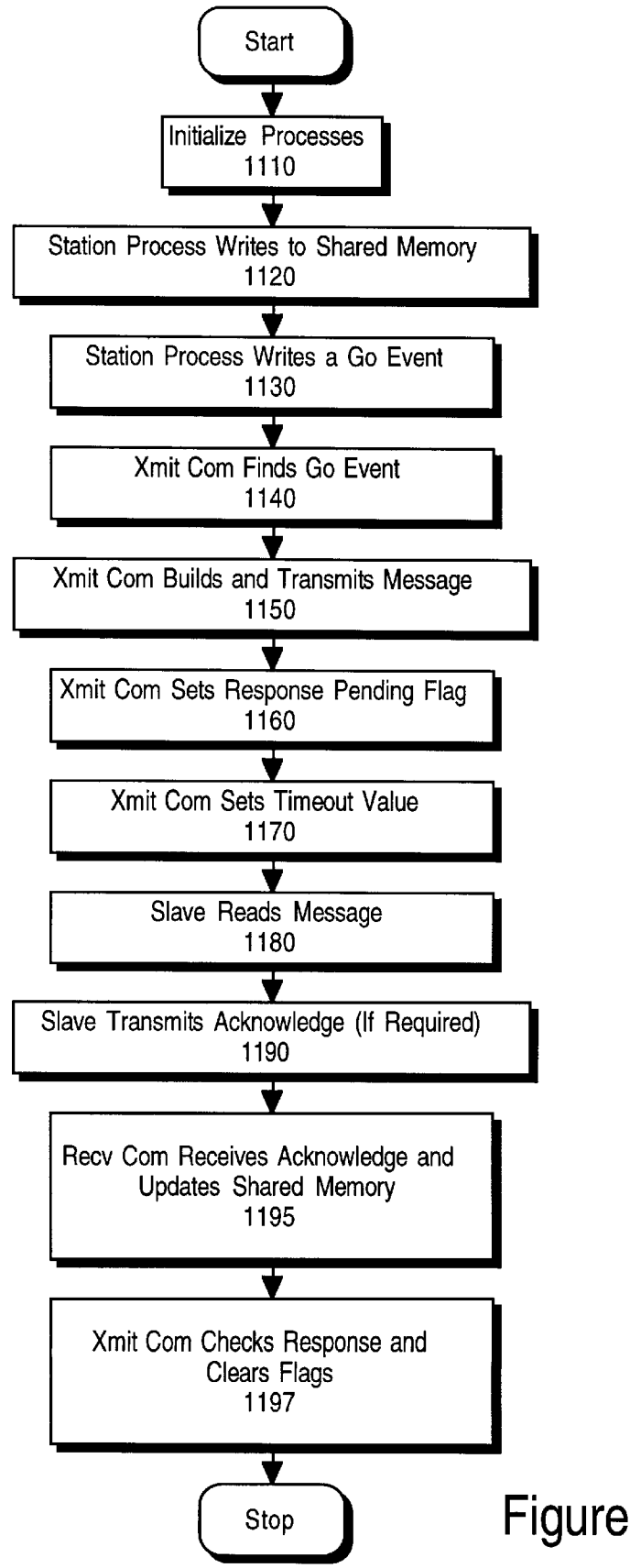
FIG. 11 is a block diagram of the typical steps performed by various processes of FIG. 7.
Figure 12:
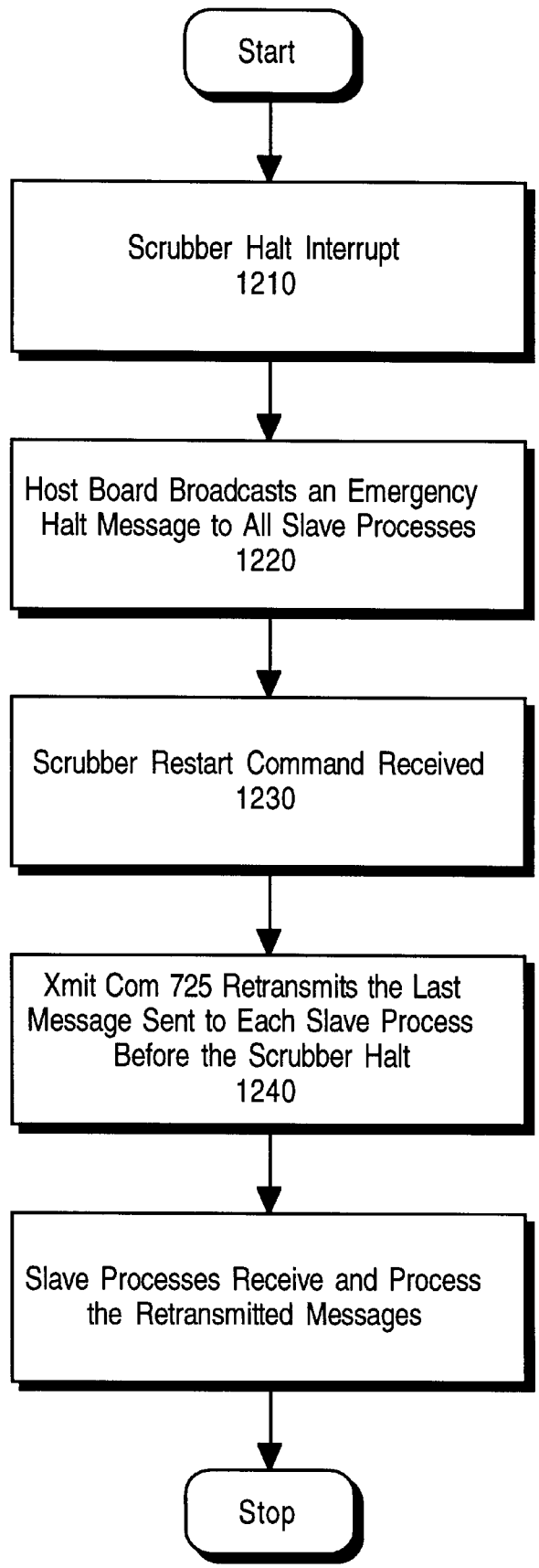
FIG. 12 is a block diagram of the steps performed when restarting from an scrubber halt.

FIG. 11 is a block diagram of the typical steps performed by various processes of FIG. 7 during the communication of messages.

At step 1110, the processes of FIG. 7 are initialized.

At step 1120, a station process determines that it must move a device in the scrubber. For example, brush 1 750 may want to set the speed of the brushes 121. To do this, brush 1 750 will write the necessary speed data to shared memory 730. In another example, a station process writes transport belt speed data into shared memory 730 for transport belt 1 115. However, brush 1 750 first locks areas of the shared memory 730 to which the brush 1 750 will be writing. In one embodiment of the present invention, processes lock sections of the shared memory 730 by setting events corresponding to the values being updated in that shared memory 730. This prevents xmit com 725 from using the data in the shared memory 730, thereby preventing the transmission or retransmission of corrupted data. After the speed data is written to the shared memory 730, the locks are cleared.

At step 1130, the station process sets a 'go' event. The go event is used to indicate that a particular slave device should act upon data in the shared memory 730.

At step 1140, xmit com 725 detects the go event (corresponding to step 820).

At step 1150, xmit com 725 then packages a message and transmits the message on the master bus 240. In this example, xmit com 725 will expect an acknowledge message from the slave, therefore, at step 1160, xmit com 725 sets a response pending flag. At step 1170, xmit com 725 sets a timeout value for a response (an acknowledge message) from the slave. Xmit com 725 then clears the go event. Xmit com 725 then waits by issuing the tsleep(1) operating system command as described above.

At step 1180, the slave process reads, and begins processing, the message from the master bus 240.

At step 1190, the slave process transmits an acknowledge (if required). In this case, the acknowledge is required, therefore, the slave process transmits the acknowledge message on the slave bus 250. The slave then begins controlling its device (stepper motor, or DC motor, etc.) according to the contents of the message.

At step 1195, the recv com 727 receives the acknowledge message and updates the event table 715 (see steps 920–945).

At step 1197, the xmit com 725 checks the event table 715 for an acknowledge. The acknowledge is found, therefore xmit com 725 clears the response pending flag and the timeout.

This completes a typical message communications for the control system of FIG. 7.

PROTOCOL

In one embodiment of the present invention, a proprietary protocol is used. This protocol is engineered to require only a few bytes per message and need little processing.

A typical message includes: a one byte address; a one byte message type; a body of the message; two checksum bytes; and an end of message character.

The address determines for which slave the message is addressed. The type of message determines how the remaining bytes in the message are to be interpreted. For example, if the message is a stepper motor type message, then the next bytes will be interpreted as such. The checksum is used to determine whether the message has been corrupted during transmission.

IMPROVED SAFETY SYSTEM

One advantage, of one embodiment of the present invention, is that recoveries from emergency halts can be achieved. One requirement of semiconductor manufacturing equipment is that if a station is opened by an operator, then the mechanical parts in the station must stop moving. In a prior art scrubber, it was not possible to stop the movement of some mechanical parts during some movements. Therefore, these stations had to be automatically locked when these movements were occurring.

In one embodiment of the present invention, a broadcast of a halt command will cause all the mechanical devices in the system to stop moving but will allow the scrubber to restart the cleaning process at the same point. The following example illustrates such an embodiment.

At step 1210, the control system detects a scrubber halt interrupt. This could occur because a station door has been opened, the operator interface 720 has issued a halt command, or the scrubber's emergency halt button has been set.

At step 1220, the host board 172 (through the use of xmit com 725) broadcasts a emergency halt message to all the slave processes. Each slave process then issues a shutdown command to its device (stepper motor or DC motor).

At step 1230, a scrubber restart command is received.

At step 1240, xmit com 725 retransmits the last messages previously sent to all the slave processes.

At step 1250, the slave processes receive these messages and restart their respective devices.

Note that by using the retransmit feature of xmit com 725, all the slave processes can be restarted from their last message. In one embodiment of the present invention, only absolute move commands can be sent to the slave processes. This reduces the amount of circuitry on the control boards because the control boards do not have to remember where they were stopped as a result of the emergency halt message.

An improved control system that can be used in a double sided wafer scrubber has been described.

What is claimed is:

1. A control system including:
   a first slave causing a first motor to rotate in response to receiving a first message addressed to said first slave, said first slave for transmitting a response message in response to receiving said first message;
   a host processor for executing a multi-tasking operating system, a control process, a transmit process, and a receive process, said control process for initiating action in said first slave, said transmit process for transmitting said first message to said first slave in response to said control process initiating action in said first slave, said transmit process further for retransmitting said first message if no response message is received for said first message, a receive process for notifying said transmit process of a receipt of said response message in response to said receipt of said response message;
   a master communications bus, coupling said first slave and said host processor, for transmitting messages from said host processor to said first slave; and
   a slave communications bus, coupling said first slave and said host processor, for transmitting messages from said first slave to said host processor.

2. The control system of claim 1 wherein said transmit process is a different process from said receive process, and wherein said transmit process waits a period of time prior to a transmission of a second message.

3. The control system of claim 1 further including a communications circuit having an external control connector, said communications circuit coupling to said master communications bus and said slave communications bus, said communications circuit providing external access to said master communications bus and said a slave communications.

4. A method of controlling a device in a control system, the method comprising the steps of:
   determining whether the device needs servicing;
   accessing device control information;
   generating and transmitting a message corresponding to the device control information;
   causing a process responsible for said step of transmitting the message to be placed at the front of a process queue;
   setting a response pending flag;
   a slave receiving the message;
   the slave transmitting control signals, corresponding to the message, to the device;
   the slave transmitting a response message;
   determining whether the response message has been received; and
   if the response message has been received, then clearing the response pending flag in response to determining that the response message has been received.

5. The method of claim 4 wherein said message includes:
   an address corresponding to an address of said slave device;
   said device control information; and
   a checksum indicating whether said message is valid.

6. A method of controlling a device in a control system, the method comprising the steps of:
   determining whether the device needs servicing;
   accessing device control information;
   generating and transmitting a first message corresponding to the device control information;
   after transmitting the first message, setting a timeout value;
   setting a response pending flag;
   a slave receiving the first message;
   the slave transmitting control signals, corresponding to the first message, to the device;
   the slave transmitting a response message;
   determining whether the response message has been received; and
   if the response message has been received, then clearing the response pending flag in response to determining that the response message has been received;
   decrementing the timeout value for each execution of the step of determining whether the response message has been received; and
   if the response message has not been received and the timeout value is below a predetermined value, then retransmitting said message.

7. In a multi-tasking system having a plurality of processes, a method of reducing a probability of slave messages colliding, said method comprising the steps of:
   a first process causing a transmission of a master message to a first slave over a slave bus;
   said master message causing the first slave to respond with a first message; and
   preventing other processes from forcing an event that will cause transmission of another message over the slave bus to a second slave by causing said first process to execute before the other processes execute, such that no two slaves will be in contention over use of the slave bus.

8. A method of control processing comprising the steps of:
   a processor executing a first process to transmit a move message to a first motor controlled by a first slave;

the processor executing a second process to receive a stop interrupt;

the processor executing the first process to broadcast a stop message to said first slave;

said first slave causing said first motor to stop moving in response to the stop message;

the processor executing the second process to receive a restart interrupt; and the processor executing the first process to retransmit said move message to said first motor in response to the second process receiving the restart interrupt.

9. The method of claim 8 wherein said move message is an absolute move message.

10. A control system comprising:

a slave controlling a first motor in response to receipt of a first message addressed to the slave;

a host processor for executing a multi-tasking operating system, a control process to initiate an action by the slave, and a transmit process to transmit the first message to the slave in response to the control process initiating the action by the slave, said transmit process further retransmitting the first message if a response message is not received for the first message indicating the slave received the first message;

a first bus coupled the slave and the host processor to transmit messages from the host processor to the slave; and a second bus coupled to the slave and the host processor to transmit messages from the slave to the host processor.

11. The control system defined in claim 10 wherein the transmit process waits a period of time prior to transmitting a second message after the first message.

12. The control system defined in claim 10 further including a communications circuit having an external control connector, the communications circuit coupled to the first bus and the second bus, the communications circuit providing external access to the first and second buses.

13. The control system defined in claim 12 wherein the host processor executes a receive process to receive a response message transmitted by the slave in response to the first message, the response message controlling whether the host processor retransmits the first message.

14. A control system comprising:

motor controlling means for controlling a first motor in response to receipt of a first message;

processing means for executing a multi-tasking operating system, a control process to initiate an action by a slave, and a transmit process to transmit the first message to the slave in response to the control process initiating the action by the slave, said transmit process further retransmitting the first message if a response message is not received for the first message indicating the slave received the first message;

a first bus means coupled the motor controlling means and processing means for transmitting messages from the processing means to the motor controlling means; and a second bus means coupled to the motor controlling means and the processing means for transmitting messages from the motor controlling means to the processing means.

15. The control system defined in claim 14 wherein the transmit process waits a period of time prior to transmitting a second message after the first message.

16. The control system defined in claim 14 further including a communications means for providing external access to the first and second buses.

17. A method for controlling a slave using a processor executing a control process, a transmit process and a receive process, the method comprising the steps of:

the processor initiating an action by the slave via the control process;

the processor transmitting a first message over a master communications bus to the slave in response to the control process initiating the action by the slave via the transmit process;

the slave controlling a first motor in response to receipt of the first message addressed to the first slave;

the slave transmitting a response message over a slave communications bus in response to receiving the first message; and the processor retransmitting the first message over the master communications bus if the response message is not received by the processor, as determined by the receive process, indicating the slave did not receive the first message.

18. A control system comprising:

a first slave;

a second slave;

a slave bus coupled to the first and second slaves;

a host processor to execute a transmit process, coupled to the first and second slaves via the slave bus, to cause transmission of a master message to the first slave, the master message causing the first slave to respond with a first message, and the host processor preventing other processes from forcing an event that will cause transmission of another message over the slave bus to the second slave by causing a first process to execute before the other processes execute, such that no two slaves will be in contention over use of the slave bus.

19. An apparatus for controlling processing comprising:

a motor;

a slave coupled to control the motor;

means for executing a transmit process to transmit a move message to a motor controlled by the slave;

means for executing a receive process to receive a stop interrupt;

wherein the means for executing the transmit process broadcasts a stop message to the slave in response to the stop interrupt being received by the receive process, wherein the slave causes the motor to stop moving in response to the stop message;

and further wherein the means for executing the receive process receives a restart interrupt; and the means for executing the transmit process retransmits the move message to the motor in response to the receive process receiving the restart interrupt.

* * * * *